United States Patent
Kaplan

(10) Patent No.: US 11,822,923 B1
(45) Date of Patent: Nov. 21, 2023

(54) PERFORMING STORE-TO-LOAD FORWARDING OF A RETURN ADDRESS FOR A RETURN INSTRUCTION

(71) Applicant: ADVANCED MICRO DEVICES, INC., Santa Clara, CA (US)

(72) Inventor: David Kaplan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/451,783

(22) Filed: Jun. 25, 2019

Related U.S. Application Data

(60) Provisional application No. 62/690,220, filed on Jun. 26, 2018.

(51) Int. Cl.
    *G06F 9/38* (2018.01)

(52) U.S. Cl.
    CPC .......... *G06F 9/3834* (2013.01); *G06F 9/3842* (2013.01); *G06F 9/3861* (2013.01)

(58) Field of Classification Search
    CPC ................. G06F 9/3834; G06F 9/3826; G06F 21/00–88; G06F 2221/00–2153; G06F 9/00–3897; G06F 15/00–825
    See application file for complete search history.

(56) References Cited

U.S. PATENT DOCUMENTS

| | | | | |
|---|---|---|---|---|
| 2006/0271770 A1* | 11/2006 | Williamson | .......... | G06F 9/3844 712/E9.06 |
| 2008/0120472 A1* | 5/2008 | Cox | ...................... | G06F 9/3834 711/145 |
| 2009/0037697 A1* | 2/2009 | Ramani | .................. | G06F 9/3834 712/214 |
| 2009/0282225 A1* | 11/2009 | Caprioli | ................ | G06F 9/3842 712/225 |
| 2010/0199045 A1* | 8/2010 | Bell | ..................... | G06F 12/0875 712/216 |

(Continued)

OTHER PUBLICATIONS

Intel (Speculative Store Bypass / CVE-2018-3639 / INTEL-SA-00115); May 21, 2018; 7 pages. Accessed on Sep. 10, 2020 at: https://software.intel.com/security-software-guidance/software-guidance/speculative-store-bypass (Year: 2018).*

(Continued)

*Primary Examiner* — Keith E Vicary

(57) ABSTRACT

A load/store unit includes a first queue including a first entry for a store operation and a second queue including a second entry for a load operation that includes a return instruction that redirects a program flow to a location indicated by the return instruction. The load/store unit also includes a processor to determine that the store operation matches the load operation and selectively perform store-to-load forwarding (STLF) of a return address for the return instruction from the first entry to the second entry based on whether the store operation is associated with a call instruction. The load/store unit forwards the return address to the second entry in response to the store operation being associated with the call instruction. The load/store unit blocks forwarding until the store operation retires in response to the store operation not being associated with the call instruction.

20 Claims, 5 Drawing Sheets

(56) References Cited

U.S. PATENT DOCUMENTS

| | | | | |
|---|---|---|---|---|
| 2011/0040955 A1* | 2/2011 | Hooker | ............... | G06F 9/3861 |
| | | | | 712/225 |
| 2012/0059971 A1* | 3/2012 | Kaplan | ............... | G06F 12/0804 |
| | | | | 711/3 |
| 2012/0137109 A1* | 5/2012 | Ramani | ............... | G06F 9/3834 |
| | | | | 712/216 |
| 2014/0108862 A1* | 4/2014 | Rafacz | ............... | G06F 9/3834 |
| | | | | 714/15 |
| 2014/0173290 A1* | 6/2014 | Kaplan | ............... | G06F 21/72 |
| | | | | 713/189 |
| 2015/0067305 A1* | 3/2015 | Olson | ............... | G06F 9/3834 |
| | | | | 712/225 |
| 2017/0185404 A1* | 6/2017 | Mekkat | ............... | G06F 9/3826 |
| 2019/0286443 A1* | 9/2019 | Solomatnikov | ............... | G06F 9/3848 |
| 2020/0133679 A1* | 4/2020 | Brandt | ............... | G06F 9/522 |

OTHER PUBLICATIONS

Schwarz et al. (Store-to-Leak Forwarding: Leaking Data on Meltdown-resistant CPUs); arXiv:1905.05725; May 14, 2019 (Year: 2019).*

* cited by examiner

PERFORMING STORE-TO-LOAD FORWARDING OF A RETURN ADDRESS FOR A RETURN INSTRUCTION

CROSS REFERENCE TO RELATED APPLICATIONS

This application claims priority to the U.S. Provisional Patent Application Ser. No. 62/690,220 filed on Jun. 26, 2018 and entitled "Preventing Branch Mis-Execution," which is hereby incorporated by reference in its entirety.

BACKGROUND

Speculative execution of instructions is used to enhance performance of processing systems. For example, a processing unit can predict the outcome of a branch instruction using information in a branch prediction structure. Speculative execution of subsequent instructions along the predicted branch is performed before the processing unit has evaluated the branch instruction (e.g., during speculative execution). If the predicted branch turns out to be incorrect when the processing unit evaluates the branch instruction (e.g., at retirement of the branch instruction), speculative execution along the incorrectly predicted branch is suspended and the state of the processing unit is rolled back to the state at the branch instruction. After the rollback, execution resumes along the correct branch. Examples of branch prediction structures used in branch prediction operations include indirect branch predictors that redirect the flow of the program to an arbitrary instruction indicated in a register referenced by the indirect branch predictor, a return address stack that includes return addresses for subroutines executing on the processing unit, and a branch target buffer (BTB) that includes information for predicting the presence and target addresses of branch instructions.

BRIEF DESCRIPTION OF THE DRAWINGS

The present disclosure may be better understood, and its numerous features and advantages made apparent, to those skilled in the art by referencing the accompanying drawings. The use of the same reference symbols in different drawings indicates similar or identical items.

DETAILED DESCRIPTION

Figure 1:
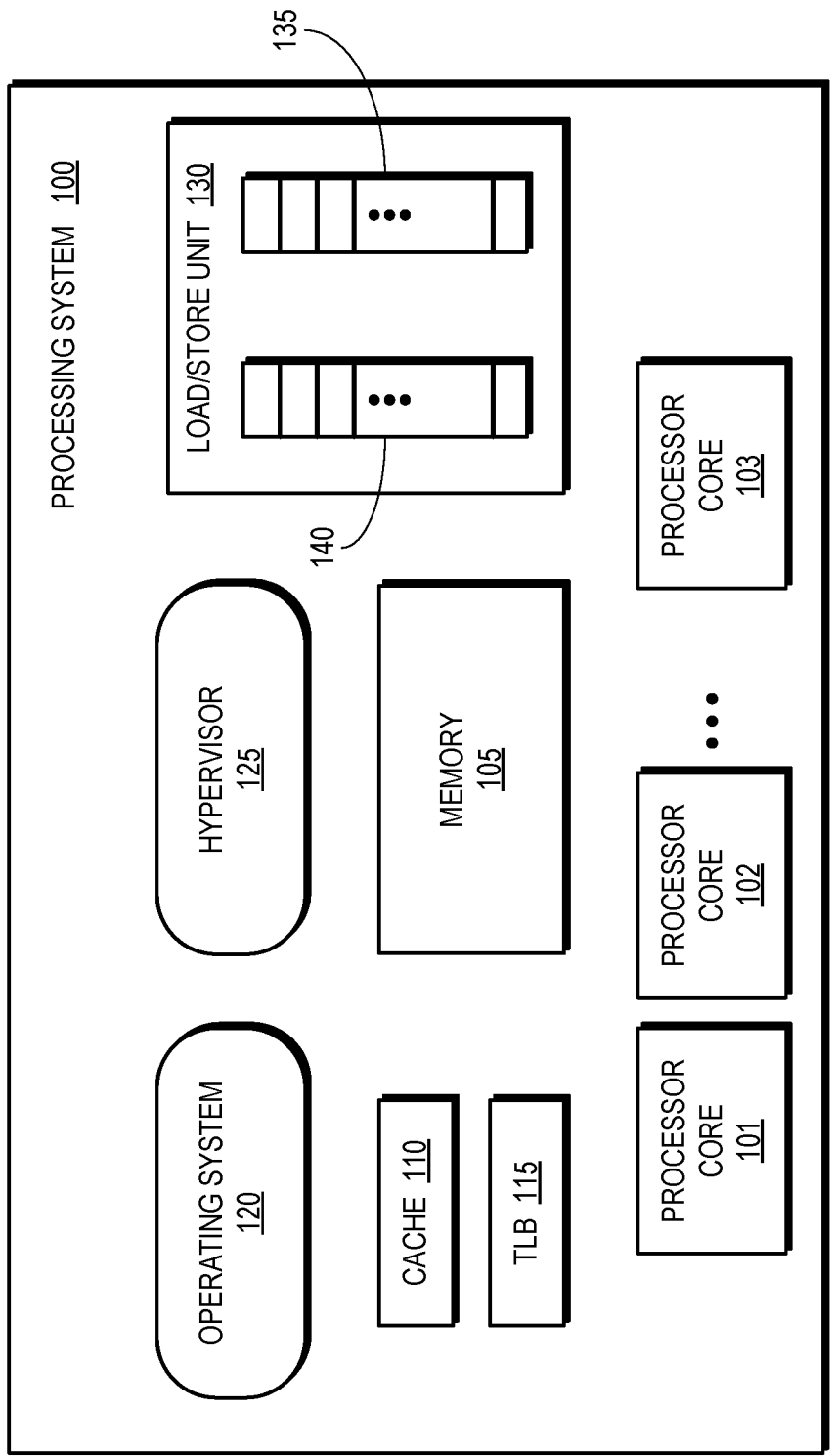
FIG. 1 is a block diagram of a processing system that prevents branch mis-execution by selectively forwarding data from a store queue to a load queue according to some embodiments.

During speculative execution, a processor may (incorrectly or otherwise) determine that an indirect branch instruction has been mis-evaluated or otherwise mis-executed. In response to determining that the indirect branch prediction has been mis-evaluated, the processor determines that execution should resume from a "correct" target of the indirect branch instruction. The processor sends a redirect signal to begin execution from the "correct" target of the indirect branch instruction. However, the "correct" target can be manipulated to cause undesirable results. In some cases, an unauthorized party may exploit this behavior to cause speculative redirection to an address that is controlled by the unauthorized party. The speculative redirection can cause the execution of code that leaks data through side channels. Existing techniques for preventing speculative redirection have focused on preventing target poisoning, thereby preventing mis-prediction of indirect branches. Mis-execution of the indirect branch instructions has not been considered. Mis-evaluation of an indirect branch prediction can be avoided by placing a serializing operation (such as LFENCE) before the indirect call that requires the indirect branch prediction. However, using serializing operations to avoid mis-evaluation of indirect branch predictions requires software to correctly identify all such cases where mis-evaluation can occur and use this information to update appropriate software to include serializing operations. In some cases, protection against mis-execution is provided by Indirect Branch Restricted Speculation (IBRS), which is a mode bit which if set, prevents indirect branches from using BTB predictions.

FIGS. 1-5 disclose embodiments of techniques to reduce or eliminate possible security vulnerabilities related to mis-execution of indirect branch instructions by identifying an in-flight store operation in a load-store queue that matches a load operation associated with a return instruction and selectively performing store-to-load forwarding (STLF) based on whether the store operation is associated with a call instruction. A return address is forwarded from the in-flight store operation to the load operation in response to the store operation being associated with the call instruction. Forwarding of the return address from the in-flight store operation is blocked until the store operation retires in response to the store operation not being associated with the call instruction. Evaluation of deployed code has shown that the vast majority of returns are to locations indicated by previous call instructions and so the performance impact of blocking STLF for in-flight store operations that are not associated with call instructions should be small.

In some embodiments, store operations are tagged in the load-store queue to indicate whether the store operations are associated with a call instruction. For example, a store operation is tagged with a first value to indicate that the store operation is associated with a call instruction and a second value to indicate that the store operation is not associated with a call instruction. Security vulnerabilities related to mis-prediction by other indirect branch instructions such as jump and call instructions are avoided by constraining the indirect branch instructions to provide redirect information (e.g., to a target address) at retire time instead of during speculative execution of the indirect branch instructions. In some embodiments, blocking forwarding and redirection until retire time is performed continuously, in predetermined hardware operation modes, on a per-virtual machine (VM) basis, in response to setting a predetermined bit in a machine specific register, or under other conditions.

FIG. 1 is a block diagram of a processing system 100 that prevents branch mis-execution by selectively forwarding data from a store queue to a load queue according to some embodiments. The processing system 100 implements one or more processor cores 101, 102, 103, which are collectively referred to herein as "the processor cores 101-103." The processor cores 101-103 execute applications (e.g., as represented by sequences of instructions or operations) that are stored in a memory 105. Some embodiments of the memory 105 are implemented as dynamic random access memory (DRAM). The processor cores 101-103 access the instructions using physical addresses, virtual addresses, or addresses of cache lines in embodiments that implement caching of instructions in a cache 110 or other portions of a cache hierarchy such as caches implemented in the processor cores 101-103. Some embodiments of the processing system 100 includes a translation lookaside buffer (TLB) 115 that stores frequently used mappings of virtual addresses to physical addresses. The processor cores 101-103 execute instructions sequentially, concurrently, or in parallel with each other. The privilege level of a process executing on one of the processor cores 101-103, the guest/hypervisor status of the process and other context state are known and controlled by a management layer including an operating system (OS) 120 for the processing system 100 or a hypervisor 125 of one or more guest virtual machines (VMs) that are executing in the processing system 100. Results of the instructions executed by the processor cores 101-103 are stored in the memory 105.

The processing system 100 also includes a load/store unit 130 that is responsible for executing load and store operations, generating virtual addresses of load and store operations, loading data from the memory 105 into one or more registers (not shown in FIG. 1 in the interest of clarity), and storing information from the registers to the memory 105. The load/store unit 130 is implemented as one or more processing units, an application-specific integrated circuit (ASIC), a field programmable gate array (FPGA), or other element that executes load and store operations. The load/store unit 130 includes one or more load queues 135 and one or more store queues 140.

The load queues 135 include entries associated with in-flight load operations that have not yet retired. Each entry includes a field for an address in the memory 105 and a field to hold the data that is read from the memory location indicated by the address. In some embodiments, load data is indicated by a virtual address and the virtual address for the load data is translated into physical addresses using the translation lookaside buffer 115. The store queues 140 include entries associated with in-flight store operations that have not yet retired. Each entry in the store queue 140 includes a field for an address in the memory 105 and a field for data that is to be stored at the location indicated by the address.

Store-to-load forwarding (STLF) is used to provide data directly from the store queue 140 to a requesting load operation in the load queue 135. For example, the store queue 140 can forward data from completed but not-yet-committed ("in-flight") store operations to later (younger) load operations in the load queue 135. When conventional STLF is implemented, the load/store unit 130 searches through all the entries in the store queue 140 for in-flight store operations to the same address as a load operation. The load operation can obtain the requested data value from a matching store operation that is logically earlier in program order (i.e., older). If more than one matching store operation is older than the load operation, the load operation obtains the requested data from the youngest matching store operation that is older than the load operation. A load operation is added to the load queue 135 when the load operation is picked for execution and receives a valid address translation from the TLB 115. The load operation uses the physical address (or possibly the virtual address) to check the store queue 140 for address matches. If an address (virtual or physical depending on the embodiment) in the store queue 140 matches the address of the data used by the load operation, STLF is used to forward the data from the store queue 140 to the load operation in the load queue 135.

Some embodiments of the load/store unit 130 may also apply other conditions to determine whether to perform STLF between store and load operations in the queues 135, 140. For example, STLF can forward data when the data block in the store queue 140 encompasses the requested data blocks. This may be referred to as an "exact match." For example, when the load operation is a 4-byte load from address 0x100, a 4-byte store to address 0x100 is an exact match. However, a 2-byte store operation to address 0xFF would not be an exact match because it does not encompass the 4-byte load operation from address 0x100 even though it partially overlaps the load operation. A 4-byte store operation to address 0x101 would also not encompass the 4-byte load operation from address 0x100. However, when the load operation is a 4-byte load from address 0x100, an 8-byte store operation to address 0x100 may be forwarded to the load operation because it is "greater" than the load and fully encompasses the load. Some embodiments apply other criteria such as requiring that the load operation and the store operation both be cacheable and neither of the instructions can be misaligned.

As discussed herein, a processor (such as one of the processor cores 101-103) sends a redirect signal to begin execution from a "correct" target of an indirect branch instruction in response to mis-execution (also referred to herein as mis-evaluation) of the indirect branch instruction. However, an unauthorized party can manipulate the "correct" target to cause speculative redirection to an address that is controlled by the unauthorized party. The speculative redirection can cause the execution of code that leaks data through side channels. For example, the address provided to a load operation associated with a return instruction can be manipulated using STLF from a store operation that differs from a store operation associated with a call instruction that preceded the return instruction. One way to prevent this behavior is to constrain STLF so that data from the store queue 140 is only forwarded to entries in the load queue 135 for load operations associated with return instructions if the entry in the store queue 140 is associated with a call instruction.

Some embodiments of the load/store unit 130 identify an entry in store queue 140 for a store operation that matches a load operation associated with an entry in the load queue 135. The load operation is associated with a return instruction that redirects a program flow of a program executing on one of the processor cores 101-103 to a location in the memory 105 indicated by the return instruction. The load/store unit 130 selectively performs STLF of data in the entry of the store queue 140 that represents a return address for the return instruction. The data is selectively forwarded to the entry in the load queue 135 based on whether the store operation is associated with a call instruction. In some embodiments, the entry in the store queue 140 is identified by matching an address in the entry of the load queue 135 to an address in the entry of the store queue 140. The data from the entry of the store queue 140 is forwarded to the entry of the load queue 135 in response to the store operation being associated with the call instruction. Otherwise, STLF is blocked for the entry in the load queue 135 until the store operation associated with the entry in the store queue 140 retires.

Figure 2:
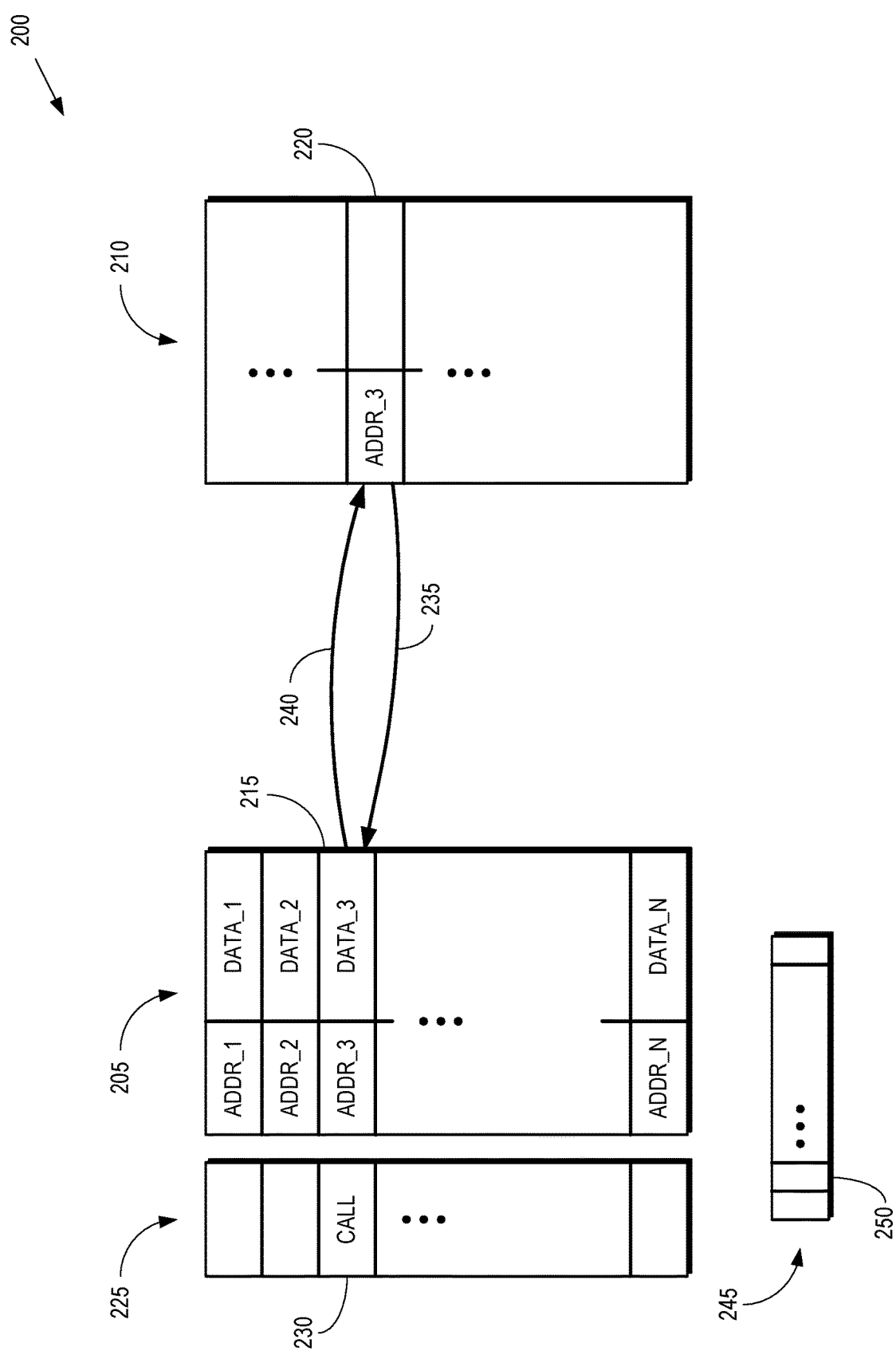
FIG. 2 is a block diagram of a load/store unit that performs store-to-load forwarding (STLF) for call/return instructions according to some embodiments.

FIG. 2 is a block diagram of a load/store unit 200 that performs STLF for call/return instructions according to some embodiments. The load/store unit 200 is used to implement some embodiments of the load/store unit 130 shown in FIG. 1. The load/store unit 200 includes a store queue 205 and a load queue 210. The store queue 205 includes entries 215 (only one indicated by a reference numeral in the interest of clarity) that have a field for holding an address in a memory that is the destination of the store operation associated with the entry 215 and a field for holding the data that is to be stored at the location indicated by the address. For example, a first field in the entry 215 includes the address ADDR_3 and a second field in the entry 215 includes the data DATA_3. Some embodiments of the store queue 205 include additional fields to hold other information associated with the store operation. The load queue 210 includes entries 220 (only one indicated by a reference numeral in the interest of clarity) that have a field for holding an address in a memory that is the source of the information retrieved by the load operation and a field for holding the data that is retrieved from the location indicated by the address. For example, a first field in the entry 220 includes the address ADDR_3. In the illustrated embodiment, the load operation associated with the entry 220 has not received the data, which in this case should be information indicating a return address for a return instruction associated with the load operation.

The store queue 205 is associated with a data structure 225 that includes information (referred to hereinafter as "tags") indicating whether store operations associated with the entries 215 are part of call instructions that are used to redirect the program flow to a location that includes a return instruction that redirects the program flow back to a location following the call instruction. Some embodiments of the data structure 225 include tags formed of one or more bits that are set to values to indicate whether the corresponding store operation is associated with a call instruction. For example, the tag 230 in the data structure 225 can include one bit that is set to a value of 1 to indicate that the store operation associated with the entry 215 is part of a call instruction. Other tags in the data structure 225 include bits that are set to values of 0 to indicate that the corresponding store operations are not part of a call instruction. Some embodiments of the data structure 225 are incorporated into the store queue 205. For example, tags in the data structure 225 can be represented as different encodings of fields of the entries in the store queue 205 such as "memory access type" or "operation type." These fields are encoded to indicate that whether the corresponding entries are associated with call instructions.

The load/store unit 200 searches the store queue 205 for entries that include addresses that match the address ADDR_3 in the entry 220 of the load queue 210. The load/store unit 200 identifies the matching address ADDR_3 in the entry 215 of the store queue 205, as indicated by the arrow 235. The load operation for the entry 220 is associated with a return instruction. Thus, in response to identifying the matching address in the entry 215, the load/store unit 200 determines whether the entry 215 is associated with a call instruction by accessing the tag 230 in the data structure 225. Based on the tag 230, the load/store unit 200 determines that the entry 215 is associated with a call instruction. Consequently, the load/store unit 200 performs STLF to forward the data DATA_3 in the entry 215 to the data field in the entry 220, as indicated by the arrow 240. The data DATA_3 is used as a destination address for the return instruction associated with the load operation for the entry 220.

Some embodiments of the load/store unit 200 include (or have access to) a register 245 such as a machine specific register (MSR). One or more bits 250 in the MSR 245 are set to values to indicate different operational modes of the load/store unit 200. Some embodiments of the load/store unit 200 operate in a first mode that selectively performs STLF substantially continuously. The first mode can be indicated by a predetermined value of one or more of the bits 250. Some embodiments of the load/store unit 200 perform STLF in response to the load/store unit 200 (or a processing system that includes the load/store unit 200) operating in a predetermined hardware mode. The load/store unit 200 can also selectively perform STLF during execution of a virtual machine (VM) or in response to setting a predetermined bit 250 in the MSR 245.

Figure 3:
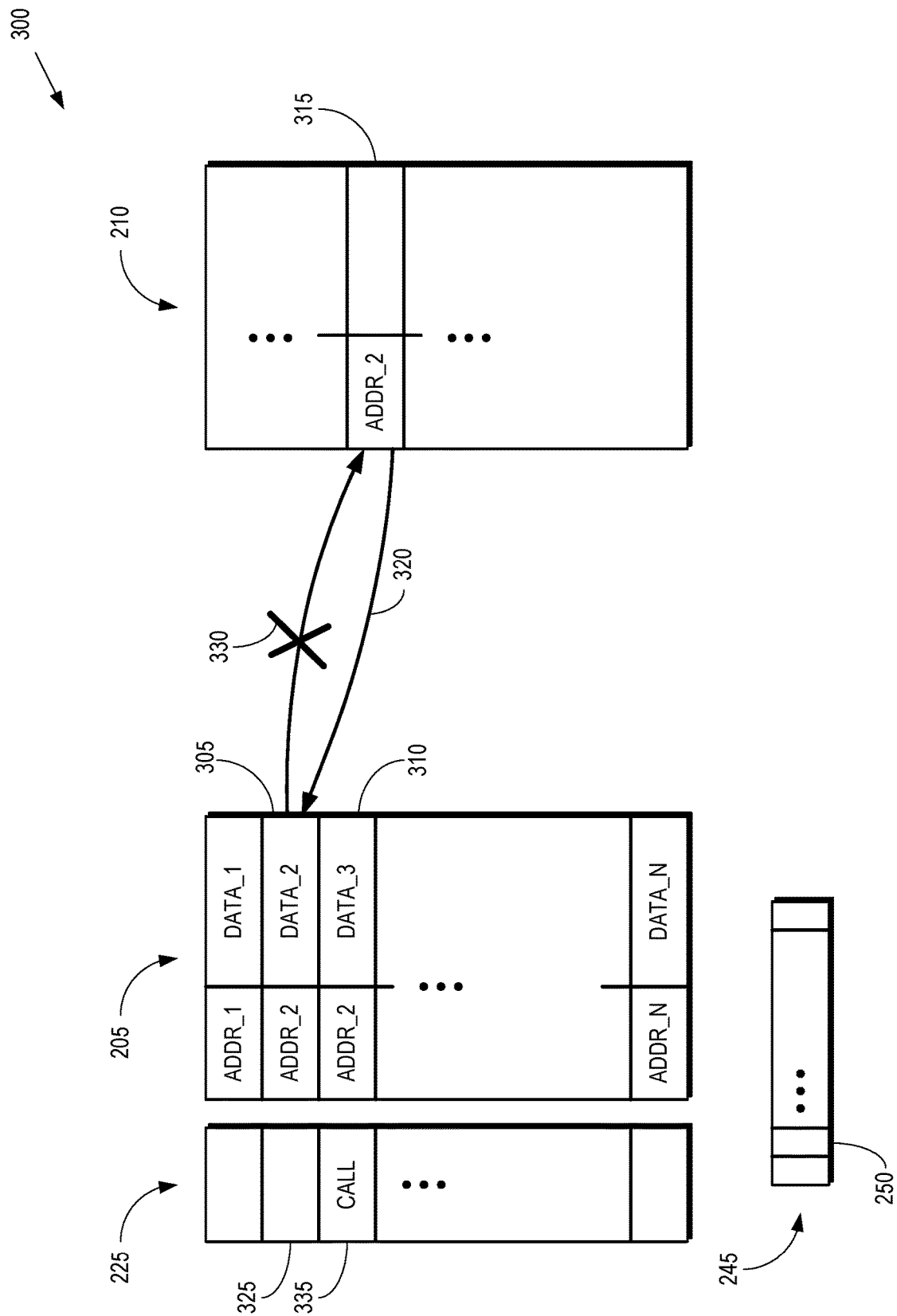
FIG. 3 is a block diagram of a load/store unit that blocks STLF for call/return instructions according to some embodiments.

FIG. 3 is a block diagram of a load/store unit 300 that blocks STLF for call/return instructions according to some embodiments. The load/store unit 300 is used to implement some embodiments of the load/store unit 130 shown in FIG. 1. The load/store unit 300 also corresponds to some embodiments of the load/store unit 200 shown in FIG. 2 and elements that are common to the load/store units 200, 300 are indicated by the same reference numerals. The load/store unit 300 includes a store queue 205, a load queue 210, a data structure 225, and an MSR 245 including one or more bits 250 that can be set to indicate an operating mode of the load/store unit 300.

The store queue 205 includes entries (such as the entries 305, 310) that have a field for holding an address in a memory that is the destination of the store operation associated with the entry and a field for holding the data that is to be stored at the location indicated by the address. For example, a first field in the entry 305 includes the address ADDR_2 and a second field in the entry 305 includes the data DATA_2. For another example, the first field in the entry 310 includes the address ADDR_2 and the second field in the entry 310 includes the data DATA_3. Some embodiments of the store queue 205 include additional fields to hold other information associated with the store operation. The load queue 210 includes entries (such as the entry 315) that have a field for holding an address in a memory that is the source of the information retrieved by the load operation and a field for holding the data that is retrieved from the location indicated by the address. For example, a first field in the entry 315 includes the address ADDR_2. In the illustrated embodiment, the load operation associated with the entry 315 has not received the data, which in this case is information indicating a return address for a return instruction associated with the load operation.

The load/store unit 200 searches the store queue 205 for entries that include addresses that match the address ADDR_2 in the entry 315 of the load queue 210. The load/store unit 200 identifies the matching address ADDR_2 in the entry 305 of the store queue 205, as indicated by the arrow 320. The load operation for the entry 315 is associated with a return instruction. Thus, in response to identifying the matching address in the entry 305, the load/store unit 200 determines whether the entry 305 is associated with a call instruction by accessing the tag 325 in the data structure 225. Based on the tag 325, the load/store unit 200 determines that the entry 305 is not associated with a call instruction. Consequently, the load/store unit 200 blocks the use of STLF to forward the data DATA_2 in the entry 305 to the data field in the entry 315, as indicated by the cross 330. The data DATA_2 is only provided to the entry 315 in response to retirement of the store operation associated with the entry 305. In the illustrated embodiment, the store operation associated with the entry 305 is younger and intervenes before the store operation associated with the entry 310, which is part of a call instruction, as indicated by the value of the tag 335. Blocking STLF from the entry 305, which is associated with the intervening non-call store operation, reduces or eliminates possible security vulnerabilities related to mis-execution of indirect branch instructions.

Figure 4:
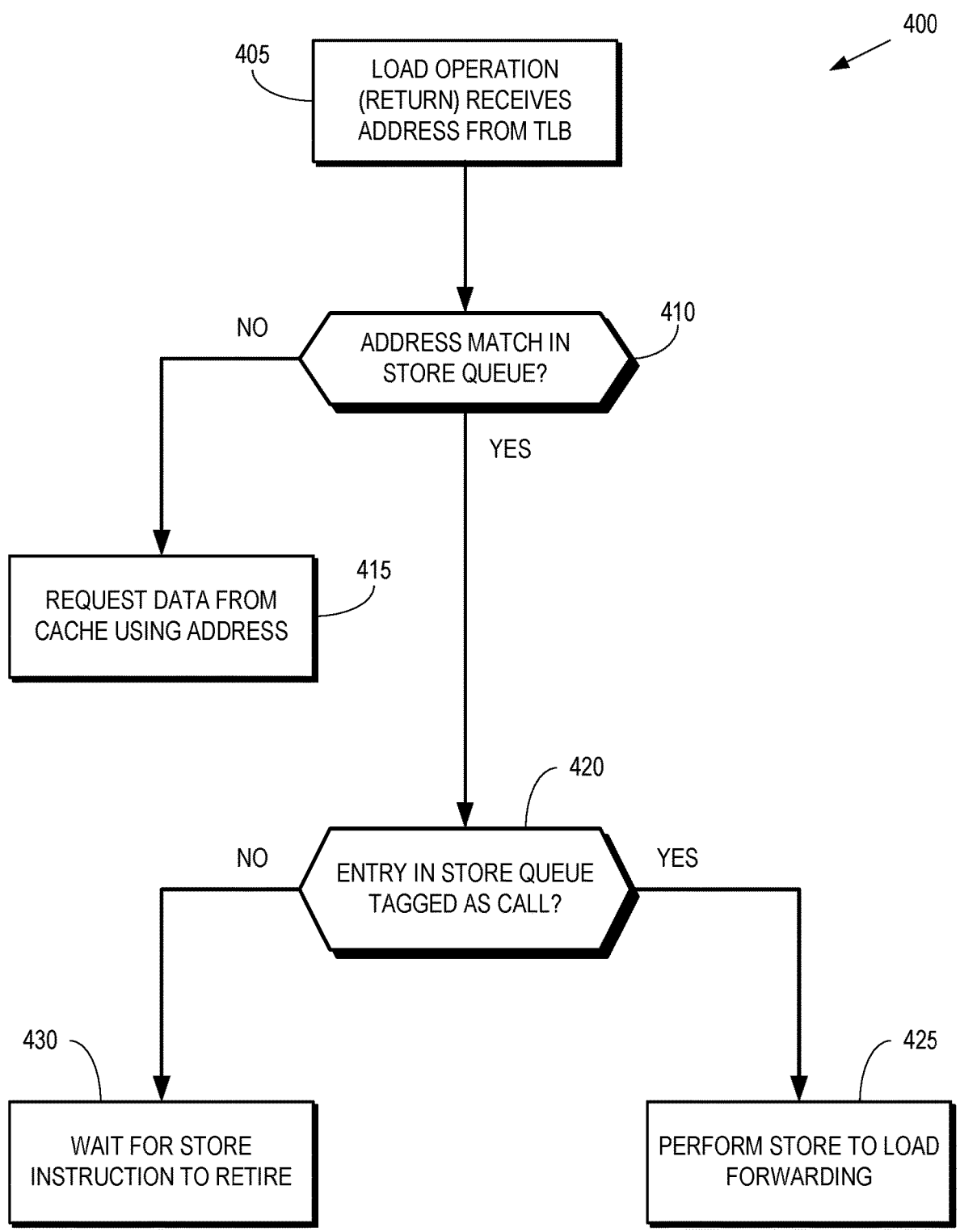
FIG. 4 is a flow diagram of a method of selectively performing STLF based on whether a store operation is associated with a call instruction according to some embodiments.

FIG. 4 is a flow diagram of a method 400 of selectively performing STLF based on whether a store operation is associated with a call instruction according to some embodiments. The method 400 is implemented in some embodiments of the load/store unit 130 shown in FIG. 1, the load/store unit 200 shown in FIG. 2, and the load/store unit 300 shown in FIG. 3.

At block 405, a load operation that is part of a return instruction receives an address translation from a TLB such as the TLB 115 shown in FIG. 1. The load operation is then added to a load queue in the load/store unit in response to receiving the address translation. The load operation has not received data, which in this case is interpreted as an address that identifies a location in a memory that includes a redirection address for the return instruction. The load/store unit therefore searches addresses in entries of the store queue to identify a potential candidate for STLF.

At decision block 410, the load/store unit determines whether an address in the entry for the load operation matches an address in an entry of the store queue. If not, the method 400 flows to block 415 and the load/store unit requests the data for the entry from a cache (such as the cache 110 shown in FIG. 1) using the address of the entry of the load queue. If the address in the entry of the load queue matches the address of an entry in the store queue, the method 400 flows to decision block 420.

At decision block 420, the load/store unit determines whether the entry in the store queue is tagged to indicate that the store operation is associated with a call instruction. In some embodiments, the load/store unit determines whether the entry is tagged to indicate an association with a call instruction based on a data structure such as the data structure 225 shown in FIG. 2. If the entry in the store queue is associated with a call instruction, the method 400 flows to block 425 and STLF is performed from the entry in the store queue to the entry in the load queue. If the entry in the store queue is not associated with a call instruction, the method 400 flows to block 430 and STLF is blocked until the store operation retires.

Figure 5:
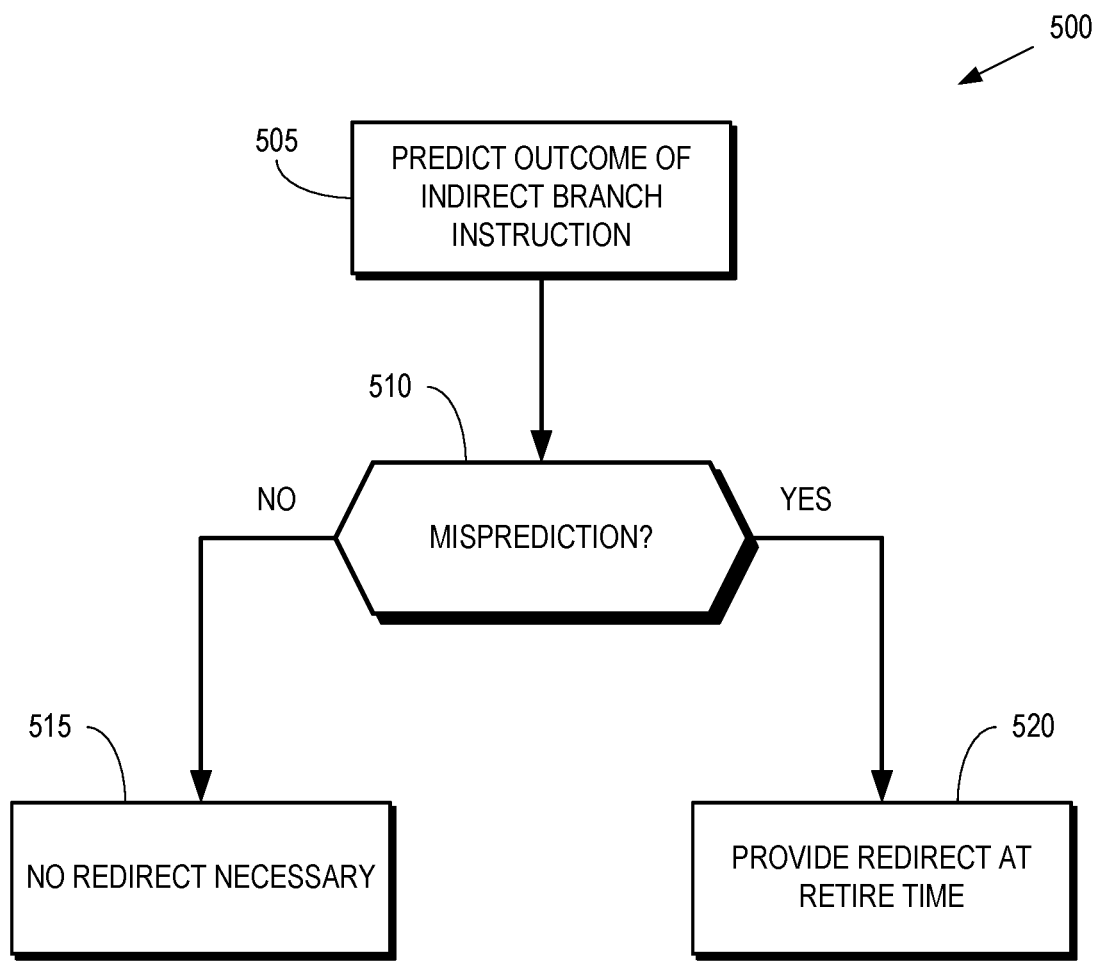
FIG. 5 is a flow diagram of a method of selectively providing redirect information for mispredictions according to some embodiments.

FIG. 5 is a flow diagram of a method 500 of selectively providing redirect information for mispredictions according to some embodiments. The method 500 is implemented in some embodiments of the processing system 100 shown in FIG. 1.

At block 505, the processing system predicts an outcome of an indirect branch instruction. In some embodiments, the outcome is predicted based on information stored in a branch prediction structure such as indirect branch predictors that redirect the flow of the program to an arbitrary instruction indicated in a register referenced by the indirect branch predictor or a branch target buffer. Examples of indirect branch instructions include jump instructions and call instructions.

At decision block 510, the processing system determines whether the outcome of the indirect branch instruction was mis-predicted. If not, the method 500 flows to block 515 and the indirect branch instruction is performed without redirection because the outcome has been correctly predicted. If the outcome of the indirect branch instruction is mis-predicted, the method 500 flows to block 520 and the redirect information is not provided until the indirect branch instruction retires. Thus, the possibility of mis-execution is prevented.

Some embodiments of the method 500 prevent speculatively executed indirect branch instructions from executing instructions at a location indicated by the mis-speculated outcome. The method 500 also prevents training of indirect predictors based on the location indicated by the mis-speculated outcome. The performance cost of implementing the method is expected to be relatively small for two reasons: (1) returns are most likely to go to the previous call site and (2) indirect branches that mis-predicted are relatively rare at least in part because they should be a dynamic indirect and the pipeline is often almost empty when a dynamic indirect branch occurs so delaying the redirection until retire time is not likely to cause a significant impact on the processing system.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    identifying a first entry in a first queue for a store operation that matches a load operation associated with a second entry in a second queue, wherein the load operation is associated with a return instruction that redirects a program flow;
    identifying whether the first entry is associated with a call instruction; and
    performing store-to-load forwarding (STLF) of a return address for the return instruction from the first entry to the second entry based on the store operation and the first entry being identified as being associated with the call instruction.

2. The method of claim 1, further comprising blocking STLF of the return address for the return instruction from the first entry to the second entry based on the first entry being identified as not being associated with a call instruction.

3. The method of claim 1, wherein the performing STLF comprises forwarding the return address from the first entry to the second entry based on the store operation and the call instruction.

4. The method of claim 1, wherein the performing STLF comprises blocking forwarding of the return address from the first entry to the second entry until the store operation retires based on the store operation and the call instruction.

5. The method of claim 1, further comprising:
    associating the first entry with a tag that identifies the association of the first entry with the call instruction.

6. The method of claim 5, wherein associating the first entry with the tag comprises associating the first entry with a tag having a value to indicate the association of the first entry with the call instruction.

7. The method of claim 5, further comprising:
    determining an association between the store operation and the call instruction based on the tag of the first entry.

8. The method of claim 1, further comprising:
    constraining indirect branch instructions to provide redirect information on a branch mis-prediction in response to retiring the indirect branch instructions.

9. The method of claim 1, wherein performing the STLF comprises:
    performing the STLF based on operating in a predetermined hardware mode, operating during an execution of a virtual machine (VM), or operating in response to setting a predetermined bit in a machine specific register (MSR).

10. An apparatus comprising:
    a first queue comprising a first entry for a store operation;
    a second queue comprising a second entry for a load operation associated with a return instruction that redirects a program flow; and
    a processor configured to determine that the store operation matches the load operation identify whether the first entry is associated with a call instruction, and perform store-to-load forwarding (STLF) of a return address for the return instruction from the first entry to the second entry based on the store operation and the first entry being identified as being associated with the call instruction.

11. The apparatus of claim 10, wherein the processor is configured to block STLF of the return address for the return instruction from the first entry to the second entry based on the first entry being identified as not being associated with a call instruction.

12. The apparatus of claim 10, wherein the performing the STLF comprises forwarding the return address from the first entry to the second entry in response to an association between the store operation and any call instruction.

13. The apparatus of claim 12, wherein the performing the STLF comprises blocking the forwarding of the return address from the first entry to the second entry until the store operation retires in response to the store operation not being associated with any call instruction.

14. The apparatus of claim 10, wherein the processor is configured to associate the first entry with a tag that identifies the association of the first entry with the call instruction.

15. The apparatus of claim 14, wherein associating the first entry with the tag comprises associating the first entry with a tag having a value to indicate the association of the first entry with the call instruction.

16. The apparatus of claim 14, wherein the processor is configured to determine an association between the store operation and the call instruction based on the tag associated with the first entry.

17. The apparatus of claim 10, wherein the processor is configured to constrain indirect branch instructions to provide redirect information to the load operation in response to retiring the indirect branch instructions.

18. The apparatus of claim 10, wherein the processor is configured to perform STLF based on operating in a predetermined hardware mode, operating during an execution of a virtual machine (VM), or operating in response to setting a predetermined bit in a machine specific register (MSR).

19. A load/store unit comprising:
    a first queue comprising entries for store operations; and
    a processor configured to:
        tag the entries with information indicating an association for the store operations and call instructions; and
        perform store-to-load forwarding (STLF) from a first entry in the first queue based on a first tag indicating the first entry being identified as being associated with a call instruction.

20. The load/store unit of claim 19, further comprising:
    a second queue comprising entries for load operations, wherein a second entry in the second queue is associated with a return instruction that redirects a program flow, wherein the return instruction is associated with a load operation, and wherein the processor is configured to perform the STLF of a return address for the return instruction from the first entry in the first queue to the second entry in the second queue, in response to the first tag indicating the first entry being identified as being associated with the call instruction and block STLF of the return address for the return instruction from the first entry in the first queue to the second entry in the second queue in response to the first tag indicating the first entry being identified as not being associated with a call instruction.

\* \* \* \* \*